A. B. ROVER.
CONTROL MECHANISM FOR ELEVATORS.
APPLICATION FILED DEC. 27, 1912.
1,206,764.
Patented Nov. 28, 1916.
4 SHEETS—SHEET 1.
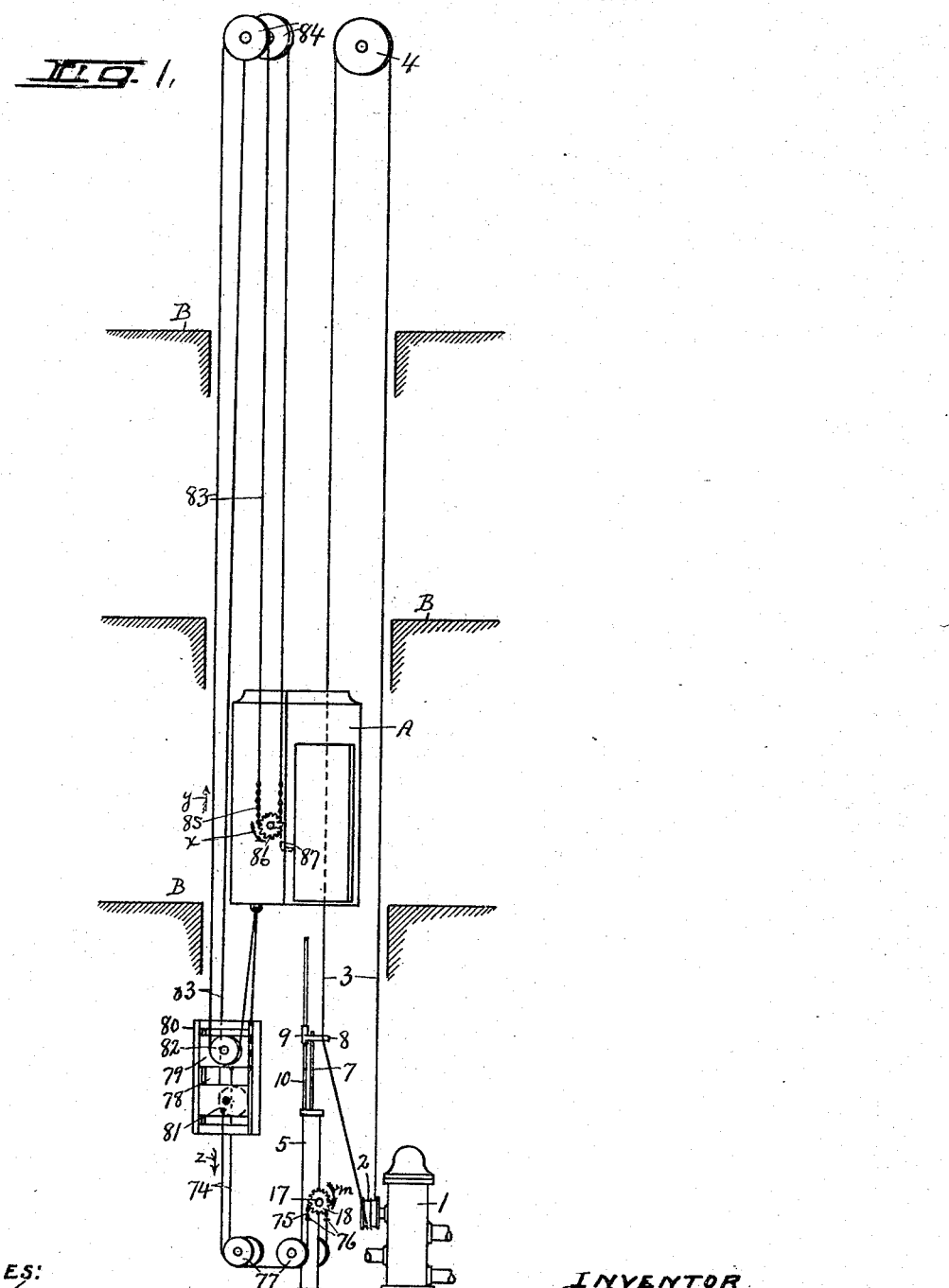

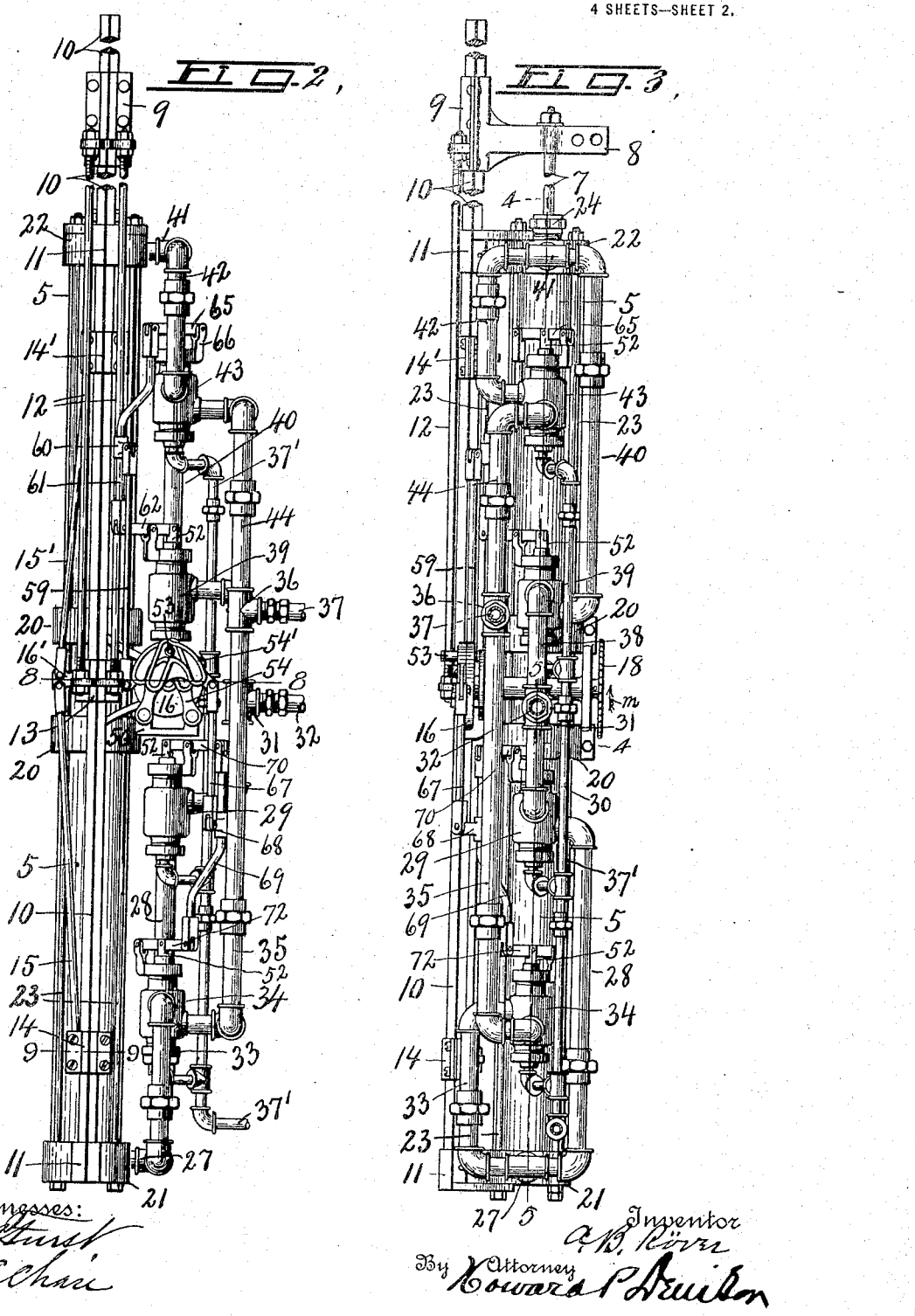

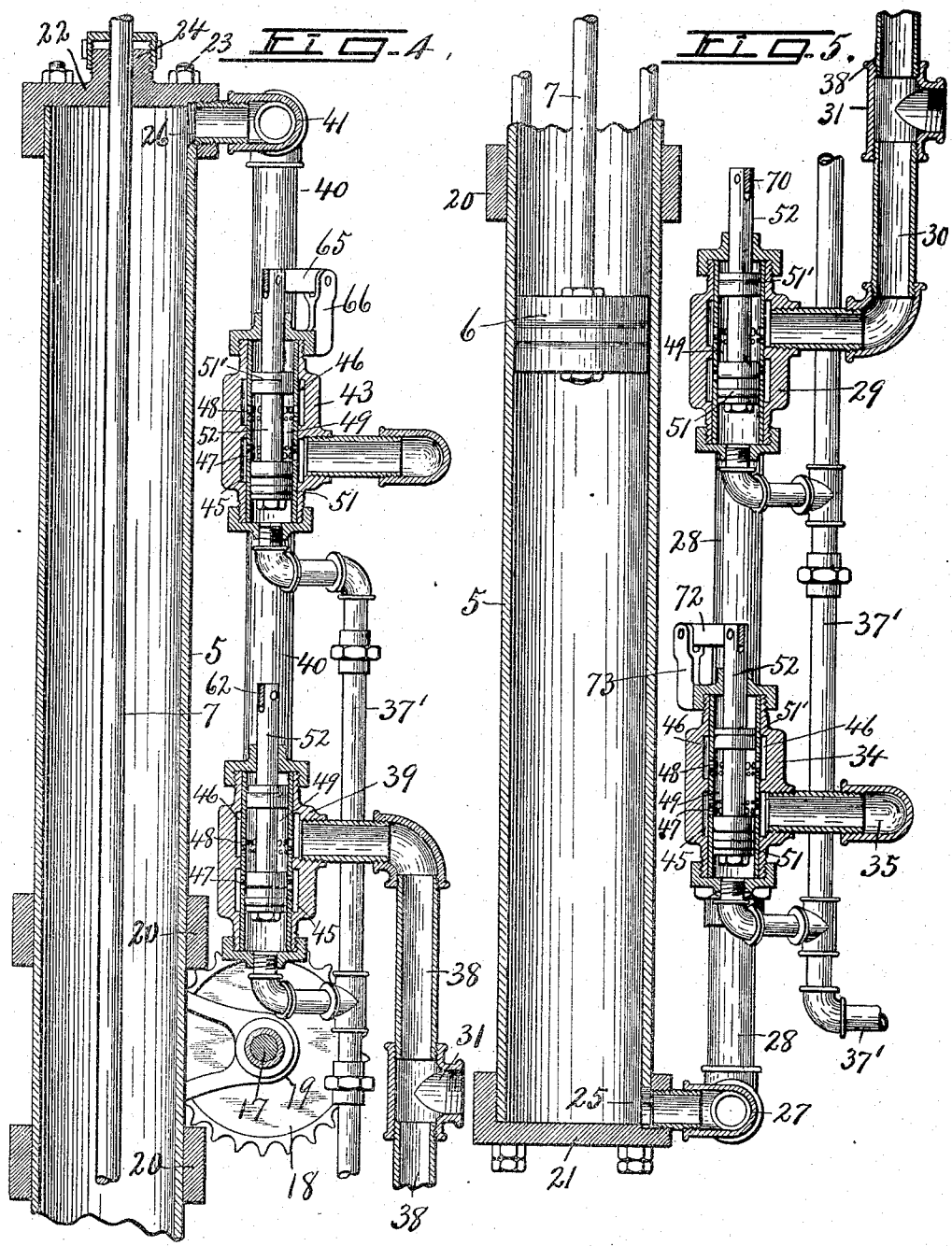

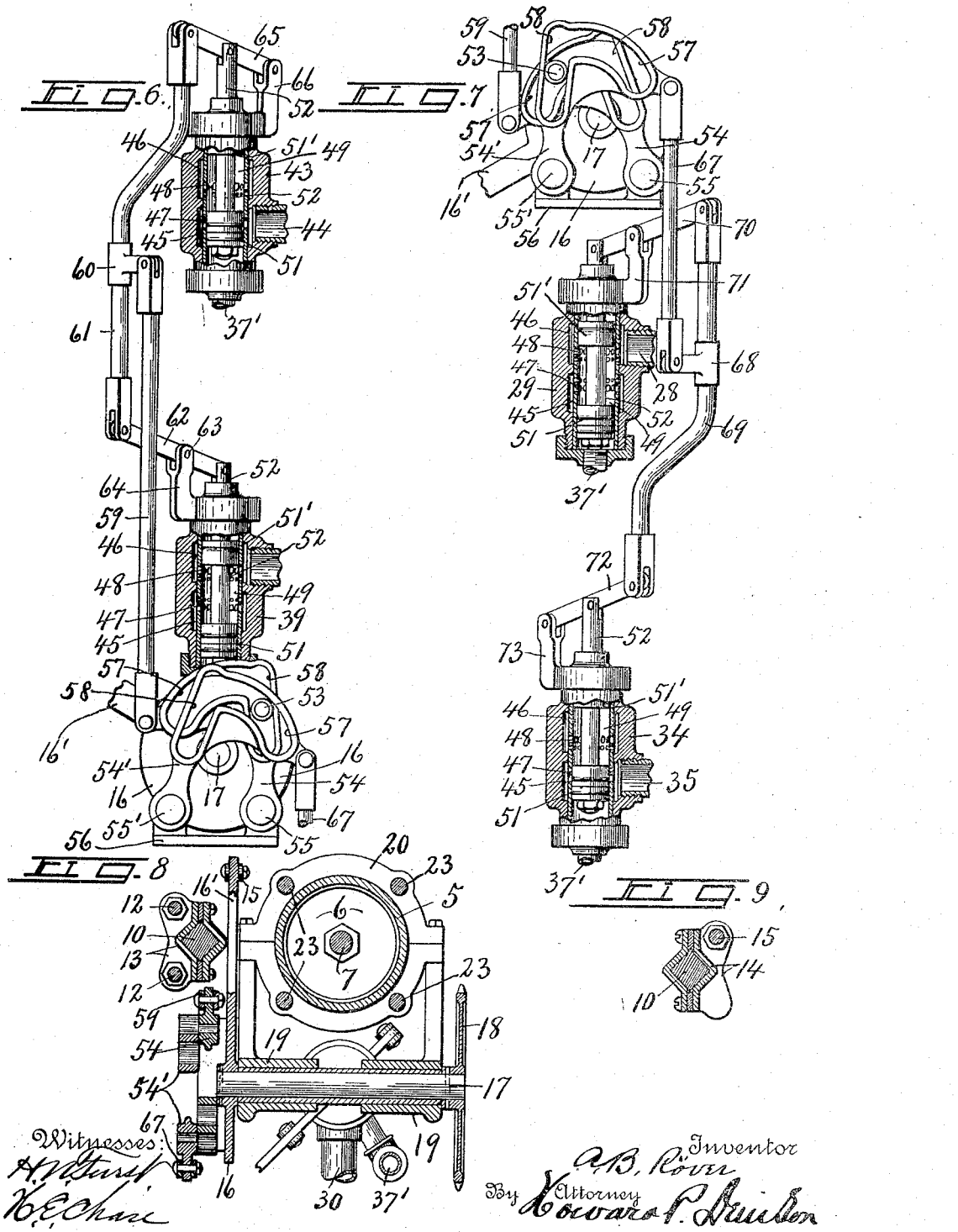

UNITED STATES PATENT OFFICE.

ADOLPH B. ROVER, OF BINGHAMTON, NEW YORK.

CONTROL MECHANISM FOR ELEVATORS.

1,206,764. Specification of Letters Patent. Patented Nov. 28, 1916.

Application filed December 27, 1912. Serial No. 738,901.

*To all whom it may concern:*

Be it known that I, ADOLPH B. ROVER, of Binghamton, in the county of Broome, in the State of New York, have invented new and useful Improvements in Control Mechanism for Elevators, of which the following, taken in connection with the accompanying drawings, is a full, clear, and exact description.

This invention relates to certain improvements in elevators comprising a vertically movable car or lift and its operating and controlling mechanism and refers more particularly to an auxiliary power-driven controller for operating the main controller as distinguished from the mechanisms employed for operating or propelling the car. This apparatus is similar in some respects to that set forth in my pending application #738,900, filed December 27, 1912, except that in that application the main controlling valve is operated by a water motor, while in this application, the main controlling valve is operated by a hydraulic lift, the other differences relating more particularly to the circulatory systems for the operating fluid for the auxiliary controllers according to the type of motor employed for operating the main controller.

The main object is to provide manually controlled power-driven means for operating the main controller, whereby it will be impossible to suddenly or abruptly stop or start the car, as in cases where the main controller is actuated directly by the operator.

Other objects and uses relating to specific parts of the controlling mechanisms will be brought out in the following description.

In the drawings, Figure 1 is a diagrammatic elevation of a portion of an elevator and my improved controlling mechanism, the elevator being adapted to be operated by hydraulic power-mechanism (not shown) except as to the main controlling valve, showing a plurality of, in this instance four, stories through which the elevator is adapted to pass. Figs. 2 and 3 are respectively enlarged side and front elevations of the auxiliary or secondary hydraulic controller. Figs. 4 and 5 are still further enlarged longitudinal vertical sectional views through the secondary controller taken respectively on lines 4—4 and 5—5, Fig. 3. Fig. 6 is an enlarged vertical sectional view of the upper set of valves of the secondary controller showing the valve operating mechanism in elevation. Fig. 7 is an enlarged vertical sectional view through the lower set of valves of the same controller showing also the operating mechanism therefor in elevation. Fig. 8 is an enlarged horizontal sectional view through the secondary controller taken on line 8—8, Fig. 2. Fig. 9 is an enlarged horizontal detail section taken on line 9—9, Fig. 2.

The elevator car as —A— may be operated vertically through one or more floors —B— by any suitable motive power (not shown) but in this instance hydraulic, controlled by a main or primary controller valve —1— having an operating member such as a drum or disk —2— by which the valve may be opened and closed to admit and cut off the power fluid, as water, to and from the usual cylinders, not necessary to herein illustrate or describe.

An operating cable —3—, preferably endless, is wound around the drum —2— and extended upwardly through the several floors and has its upper end passed around a super-posed sheave or drum —4— so as to permit either side of the cable to move freely in either direction independently of the car to open and close the valve —1— which is usually located in the basement or cellar.

The auxiliary or secondary hydraulic controller comprises an upright cylinder —5— having a piston —6— movable vertically therein and provided with an upwardly extending rod —7— to which is secured a laterally projecting cross arm —8— having direct connection with one side of the cable —3—. This cross arm —8— is provided with a split hub —9— slidably mounted upon a vertically disposed rod —10— which is arranged at one side of but in close proximity to the cylinder —5— and is secured to the base and top of said cylinder by suitable clamps —11— as shown more clearly in Figs. 8 and 9, said rod being preferably angular in cross section to hold the arm —8— against turning and extends upwardly above the cylinder a distance somewhat greater than that through which the piston —6— is adapted to move.

The hub of the arm —8— is connected by a pair of vertical rods —12— to a sliding cross head —13— on the intermediate portion of the rod —10— between the clamping heads —11— for engaging and operating one or the other of a pair of sliding stops —14— and —14'— also mounted upon the rod —10— at points below and above the cross head —13—.

The sliding stops —14— and —14'— are connected respectively by rods —15— and —15'— to one end of a rock arm or lever —16'— projecting radially from and preferably forming a part of a disk —16—, the latter being rigidly secured to one end of a relatively short transverse shaft —17— having its opposite end provided with an operating member consisting of a sprocket wheel —18—.

The shaft —17— is journaled in suitable bearings —19— projecting laterally from one side of split clamping rings —20— which are rigidly secured to the central portion of the cylinder —5— as shown more clearly in Fig. 8.

The lower and upper ends of the cylinder are closed by end heads —21— and —22— which are connected externally to the cylinder by a series of, in this instance four, vertical rods —23— passing through registering apertures in the clamping rings —20— for the purpose of drawing the end heads firmly into engagement with the corresponding ends of the cylinder, the upper head being provided with a suitable gland or stuffing box —24— through which the piston rod —7— is adapted to play.

*Piston operating means for the secondary controller.*—The piston of the secondary controller is adapted to be operated by hydraulic pressure for operating the main or primary valve —1— through the medium of the cable —3— and its connection with the cross arm —8— and drum —2— and for this purpose the lower and upper ends of the cylinder —5— are provided with ports —25— and —26— located at the opposite ends of and some distance from the piston —6— when the latter is in its normal or intermediate position. The lower port —25— is connected to a T —27— having one branch connected by an upwardly extending pipe —28— to the lower port of a two-port valve-case —29— having its upper port connected by an upwardly extending pipe —30— to one branch of a supply T —31— to which the power fluid is supplied from any available source by a supply pipe —32— as shown more clearly in Figs. 3, 4, 5 and 6. The other branch of the T —27— leading from the lower port —25— is connected by an upwardly extending pipe —33— to the upper port of a two-port valve —34— having its other port connected by an upwardly extending pipe —35— to one branch of a relief T —36— having a relief pipe —37— leading therefrom. The other branch of the supply T —31— is connected by an upwardly extending pipe —38— to the upper port of a two-port valve-case —39— having its other or lower port connected by an upwardly extending pipe —40— to one of the branches of a T —41— leading to the upper port —26—, the other branch of the T —41— being connected by a downwardly extending pipe —42— to the upper port of a two-port valve-case —43— having its lower port connected by a relief pipe —44— to the corresponding branch of the relief T —36—.

The valve casings —29—, —34—, —39— and —43— and the valves therein are all of the same construction and are arranged in sets in vertical alinement one above the other, the valves in the casings —29— and —34— constituting one set to elevate the piston —6— and cross arm —8— for operating the main valve —1— to cause the descent of the car —A—, while on the other hand the valves in the upper set of the casings —39— and —43— control the entrance of the pressure fluid to the upper end of the cylinder —5— to depress the piston —6— and its cross arm —8— for the purpose of operating the main valve —1— to cause the car to ascend. For this purpose each valve casing is provided with separate co-axial lower and upper chambers —45— and —46— communicating through separate sets of ports —47— and —48— with an inner valve chamber —49— in which is movable a pair of valves —51— and —51'—, the latter being spaced a sufficient distance apart to open both sets of ports —47— and —48— between them and are connected by a rod —52— extending through a suitable gland in the top of each valve case.

The valves of each set are adapted to be operated separately by suitable mechanisms in operative connection with the disk —16— of the shaft —17— and are therefore controlled by the sprocket wheel —18— in a manner hereinafter described, the lower valves —51— of each pair serving to open and close the lower ports —47— while the upper valves —51'— merely serve to equalize the pressure between the valves and are always open above the adjacent ports —48—. The lower end of each valve case is connected to a drainage pipe —37'—.

The connections between the several valves and disk —16— are adjusted so that when the actuating sprocket wheel —18— for the disk is in a normal predetermined position of rest, the lower valves —51— in the valve casings —29— and —39— are closed, while the other lower valves in the casings —34— and —43— are normally open, the connections for the upper set of valves serving to close the normally open valve and to open the normally closed valve when the disk —16— and its actuating member —18— are rocked in one direction, while the connections between said disk and the other set of valves serve to open the corresponding normally closed valve and to close the normally open valve of that set when the disk —16— and its operating member —18— are rocked in the reverse direction from their normal position. For this purpose the disk —16— is provided with a laterally projecting stud or roller —53— in coöperative engagement with a pair of similar but reversely arranged cam levers —54— and —54′— as shown more clearly in Figs. 2, 6, 7 and 8, said cams being pivoted at —55— and —55′— to a suitable bracket —56— on the lower intermediate ring —20— of the cylinder —5—. These cam levers are provided with angular slots, portions of which as —57— are substantially concentric with their pivots while other portions as —58— are substantially radial relatively to said pivots, the sides of the radial slots forming abutments located in the path of movement of the stud or roller —53—, while the concentric portions of said slots allow the stud to move therein without operating the corresponding cam lever.

The lever —54— constitutes a part of the mechanism for operating the upper set of valves and for this purpose its free end is pivotally connected to the lower end of an upright rod —59— having its upper end pivotally connected to a yoke —60— of another upright vertically movable rod —61—. The lower end of the rod —61— is pivotally connected to a lever —62— which is pivoted at —63— to a bracket —64— on the upper end of the valve case —39—, the inner end of the lever being pivotally connected to the valve rod —52— of said valve case —39—. The upper end of the rod —61— is pivotally connected to one end of a lever —65— which is pivoted intermediate its ends to the plunger rod —52— in the valve case —43— and its other end is pivoted to a bracket —66— on the outer end of said valve case —43—.

The lower set of valves are operated by the cam lever —54′— and for this purpose the free end of said cam lever is pivotally connected to the upper end of a vertically movable rod —67— having its lower end pivotally connected to a yoke —68— on another vertically movable rod —69—. The upper end of this latter rod —69— is pivotally connected to one end of a lever —70— which is fulcrumed intermediate its ends upon a suitable bracket —71— on the upper end of the valve case —29— and its other end is pivotally connected to the upper end of the valve rod in such valve case in the manner shown in Fig. 7. The lower end of the rod —69— is pivotally connected to one end of a lever —72— which is pivoted intermediate its ends to the upper end of the valve rod —52— in the case —34—, the other end of said lever —52— being pivotally connected to a bracket —73— on the upper end of such valve case.

In Figs. 2, 3, 4 and 5 the several valves and their operating mechanisms are shown in their normal positions, while in Fig. 6 the upper set of valves and operating mechanism therefor are shown in position for admitting the pressure fluid to the upper end of the cylinder for forcing the piston therein downwardly and thereby operating the main valve —1— to cause the ascent of the elevator car —A— while in Fig. 7 the lower set of valves and their operating mechanism are shown in position for admitting the pressure fluid to the lower end of the cylinder for raising the piston —6— in the cylinder —5— and thereby reversing the operation of the valve —1— to cause the descent of the car.

Any suitable means may be employed for rocking the shaft —17— in reverse directions from its normal position and for this purpose I have provided a cable —74— having its intermediate portion provided with a sprocket-chain-section —75— passed around the upper side of the sprocket wheel —18— and provided with suitable limiting stops —76— for limiting the rotary movement of said sprocket wheel, the ends of the cable being then passed around the undersides of suitable sheaves —77— and then upwardly and attached to weighted members —78— and —79— of a suitable compensating device or equalizer having a frame —80— in which the weighted members —78— and —79— are guided for relative vertical movement. Journaled upon these weighted members —78— and —79— are sheaves —81— and —82— around the undersides of which are passed the ends of a suitable cable —83—, said ends being extended upwardly and attached to the underside of the car. This compensating device is preferably located in the basement or cellar of the building in which the elevator is installed, the cable —83— being extended therefrom upwardly to the top of the elevator shaft over sheaves or idlers —84— and then downwardly preferably into the car where the intermediate portion of such cable is provided with a sprocket chain section —85— passing around the underside of a sprocket wheel —86—, said sprocket wheel having a suitable operating member as a crank arm —87— by which it may be rotated to operate the cable in reverse directions for transmitting relative movement to the weighted members —78— and —79— and thereby operating the sprocket wheel —18— in one direction or the other according to the direction of movement of the crank arm —87—. This operation of the sprocket wheel —18— from its normal position will cause a corresponding movement of the stud or roller —53— to operate one of the cam levers —54— or —54'— according to the direction of movement of the sprocket wheel, thereby shifting the corresponding set of valves to permit the flow of the pressure fluid to one or the other end of the cylinder for operating the piston therein and causing a similar operation of the cable —3— and main controlling valve —1— so as to cause the ascent or descent of the elevator car by its power fluid according to the direction of movement of the main controlling valve —1— from its normal position. For example, assuming that the operating member —2— of the main controller —1— is in its normal or neutral position with the power operating fluid for the car cut off and the car at rest and that it is desired to cause the descent of the car, then by moving the lever —87— and its sprocket —86— in the direction indicated by arrow —x— Fig. 1, the opposite sides of the cable —83— will be moved in opposite directions indicated by arrow —y—, thereby moving the sliding members —78— and —79— in opposite directions away from each other and causing a corresponding movement of the opposite sides of the cables —74— in opposite directions indicated by arrow —z— to rotate the sprocket wheel —18— in the direction indicated by arrow —m— in Figs. 1 and 3. This operation of the sprocket wheel —18— will impart corresponding movement to the shaft —17— and disk —16—, thereby forcing the stud —53— against the outer wall of the radial slot of the cam lever —54'— to shift said cam lever to the position shown in Fig. 7, thus opening the normally closed valve —51— in the valve case —29— by downward movement and closing the normally open valve —51— in the valve case —34— by upward movement through the medium of the connecting rods —67— and —69— and levers —70— and —72—. This operation of the valves in the casings —29— and —34— allows the fluid under pressure to flow from the inlet —32— through the pipe —30—, valve case —29— and pipe —28— and thence through the port —25— into the lower end of the cylinder, the valve —51— in the casing —43— being open and the valve —51— in the casing —39— being closed to prevent the passage of the pressure fluid therethrough whereby the entire pressure is concentrated in the lower end of the cylinder to elevate the piston —6— and its piston rod —7— to open the main controller valve —1— through the medium of the cable —3— which is connected to the arm —8— on the piston rod, this operation of the main controller serving to allow the car to descend.

By the reverse operation of the hand lever —87— and its sprocket —86— from its normal position, the movable members —78— and —79— and sprocket wheel —18— will be operated in a reverse direction, thereby shifting the cam lever —54— to open the normally closed valve —51— in the casing —39— and close the normally open valve —51— in the casing —43— to admit the pressure fluid to the upper end of the cylinder for depressing the piston therein and thereby reversing the operation of the operating member —2— for the main controller —1— to cause the ascent of the car.

It will be observed that when the valves in the casings —29— and —34— are shifted from their normal positions shown in Fig. 5 to the position shown in Fig. 7 to admit the pressure fluid to the bottom of the cylinder, the upper set of the valves in the casings —39— and —43— will remain in their normal position to cut off the supply of the pressure fluid to the upper end of the cylinder and to connect the upper end of the cylinder with the relief outlet —37—, thus permitting the displacement of the water from the upper end of the cylinder as the piston rises.

In reverse manner when the upper set of valves in the casings —39— and —43— are adjusted from their normal positions shown in Fig. 4 to the positions shown in Fig. 6, the valves in the casings —29— and —34— will be restored to their normal positions to cut off the supply of the pressure fluid to the bottom of the cylinder and establish communication between the bottom of the cylinder and relief outlet —37— through the pipes —33—, valve casing —34— and pipe —35— to allow the displacement of the water from the bottom of the cylinder as the piston descends.

Again when the cam levers —54— and —54'— and upper and lower sets of valves are returned to their normal positions shown more clearly in Figs. 2, 4 and 5, the pressure fluid supply will be cut off from both ends of the cylinders by the closing of the valves —51— in the casings —29— and —39— respectively, while the remaining valves —51— in the casings —34— and —43— will be open, thereby establishing open communication between the lower and upper ends of the cylinders through the pipes —33—, —42—, —35— and —44— and valve casings —34— and —43— so as to permit a free movement of the piston —6— in either direction under equal pressure at opposite ends thereof.

*Restoring means for secondary controller.*—I have now described the mode of operation of the secondary controller for operating the main controller to raise and lower the car and while it is evident that the valves of the secondary controller may be restored to their normal positions to cut off the water pressure to either end of the cylinder to stop the action of the secondary controller by simply restoring the operating member —87— in the car to its normal position, it is preferable to have this restoration of the valves and stoppage of the secondary controller automatic and dependent upon the movement of the piston in either direction, and for this purpose I have provided the sliding cross head —13— and sliding stops —14— and —14'— which are connected to the arm —16'— of the disk —16— by the rods —15— and —15'—.

The cross head —13— which is connected to the piston rod —7— by means of the rods —12— and clamping head —9— is normally positioned substantially midway between the ends of the cylinder as shown more clearly in Fig. 2, while the cross arm —8— to which the cable —3— is attached is normally positioned substantially midway of its extreme upward and downward movements with sufficient clearance above the cylinder to move the controller in reverse directions in raising and lowering the car.

The stops —14— and —14'— are normally positioned equi-distant from opposite ends of the cross head, this distance being substantially equal to the necessary movement of the piston from its normal position for operating the main controller —1— in either direction.

It is now apparent that the degree of movement of the sliding stops —14— and —14'— corresponds to the throw of the rock arm —16'— from its normal position when operating the auxiliary controller valves to admit the pressure fluid to one or the other end of the cylinder. For example, when one of the levers as —54— is operated by the disk —16— to operate the upper set of valves to admit the pressure fluid to the upper end of the cylinder for the purpose of forcing the piston downward, the lower sliding stop —14— will be elevated or moved toward the cross head so that as the piston and cross head descend together to shift the controller —1— in one direction for elevating the elevator car, the downward movement of the cross head will engage and depress the lower sliding stop and thereby restore the upper sliding stop —14'—, arm —16'— and lever —54— together with the upper set of valves connected thereto to their normal position and at the same time restoring the disk —16— and operating member —18— to their normal positions.

In reverse manner when the lower set of valves are operated to admit the pressure fluid to the lower end of the cylinder for elevating the piston, the sliding stops —14— and —14'— will be depressed by the cross arm —16'— so that as the piston —6— and cross head —13— rise, the cross head will encounter and elevate the upper sliding stop —14'— to restore the lower set of valves to their normal position and thereby cut off the pressure fluid from the corresponding end of the cylinder.

*Restoring means for the main controller.*—I have now described how the main controller is operated to raise and lower the car and will proceed to describe the means by which it may be restored to its normal position for stopping the car. This may be accomplished by reversing the operating member —87— in the car at the proper time so as to cause the car to stop at any predetermined point in its ascent or descent. For example, assuming that this operating member —87— has been turned in one direction to operate the auxiliary controller and through said auxiliary controller to operate the main controller to cause the car to move in one direction. Then it follows that if the operating member —87— is reversed so as to cause the reverse action of the auxiliary controller, the valve of the main controller will be operated in the reverse direction until brought to its neutral position for cutting off the fluid supply which operates the car, at which time the controlling member —87— must be restored by hand to its neutral position to effect the cutting off of the supply of the motive fluid to the auxiliary controller and thereby prevent its further operation beyond its neutral position.

The operation of my invention will now be readily understood upon reference to the foregoing description and the accompanying drawing, and it will be apparent that various changes may be made in the detail construction of the auxiliary controller and its operating means and also in the connections of the cables between the car and differential without departing from the spirit of my invention.

What I claim is:—

1. In an elevator controlling mechanism for hydraulic elevators, in combination with a main valve, operating means therefor, comprising a cylinder having ports in opposite ends thereof, a supply pipe connected to both ports, a relief pipe connected to the same ports, normally open relief valves in the relief pipe, normally closed valves in the supply pipe, and voluntarily operated means for closing one of the relief valves and for simultaneously opening one of the closed supply valves independently of the other valves.

2. A controlling mechanism for elevators comprising a main controller, an operating cable therefor, a cylinder, a piston movable in the cylinder, means actuated by the piston for operating the cable, a supply pipe and a relief pipe both connected to one end of the cylinder and provided respectively with a normally closed valve and a normally open valve, and means, operable at will, for opening the normally closed valve and simultaneously closing the normally open valve.

3. A controlling mechanism for elevators comprising a main controller, an operating cable therefor, a cylinder, a piston movable in the cylinder, means actuated by the piston for operating the cable, a supply pipe and a relief pipe both connected to one end of the cylinder and provided respectively with a normally closed valve and a normally open valve, a separate cable operable at will, and additional means actuated by the last-named cable for operating said valves simultaneously.

4. A controlling mechanism for hydraulic elevators comprising a main valve, a cable for operating said valve, and operating means for the cable comprising a cylinder, having ports in its opposite ends, conduits for the pressure fluid leading to said ports and having separate sets of valves therein, and means movable in one direction for operating one set of valves and in a reverse direction for operating the other set.

5. A controlling mechanism for hydraulic elevators comprising a main valve, a cable for operating said valve, and operating means for the cable comprising a cylinder, a normally closed supply valve and a normally open relief valve both connected to one end of the cylinder and constituting one set, a separate normally closed supply valve and a normally open relief valve connected to the other end of the cylinder and constituting another set, and voluntarily operated means for operating one set of valves independently of the other set.

6. In a hydraulic elevator system, the combination with a main valve for controlling the operation of the car, of an auxiliary hydraulic controller, means actuated by a moving part of the auxiliary controller for operating the main valve, separate sets of valves controlling the pressure fluid to the hydraulic controller to cause its moving part to be operated in reverse directions, means for shifting either set of valves independently of the other set, and means actuated by said moving part for restoring the shifted set of valves to normal position independently of the main valve.

7. In a hydraulic elevator system, the combination with a main valve for controlling the operation of the elevator, of an auxiliary hydraulic controller, means actuated by a moving part of the auxiliary controller for operating the main valve, separate sets of valves controlling the pressure fluid to the auxiliary controller so as to cause the movable part to be shifted first in one direction and then in the opposite direction, and means operable at will for shifting either set of valves independently of the other set.

8. In a hydraulic elevator system, the combination with a main valve for controlling the operation of the elevator, of an auxiliary hydraulic controller, means actuated by a moving part of the auxiliary controller for operating the main valve, separate sets of valves controlling the pressure fluid to the auxiliary controller so as to cause the movable part to be shifted first in one direction and then in the opposite direction, means operable at will for shifting either set of valves independently of the other set, and a restoring device for the last-named means actuated by said moving part while the main valve is still open.

In witness whereof I have hereunto set my hand this 12th day of December, 1912.

ADOLPH B. ROVER.

Witnesses:
H. E. CHASE,
EVA E. GREENLEAF.

Copies of this patent may be obtained for five cents each, by addressing the "Commissioner of Patents, Washington, D C."